Aug. 1, 1950
G. A. MORTON
2,517,404
SCINTILLATION TYPE RADIATION DETECTOR
AND COINCIDENCE CIRCUIT THEREFOR
Filed April 1, 1949
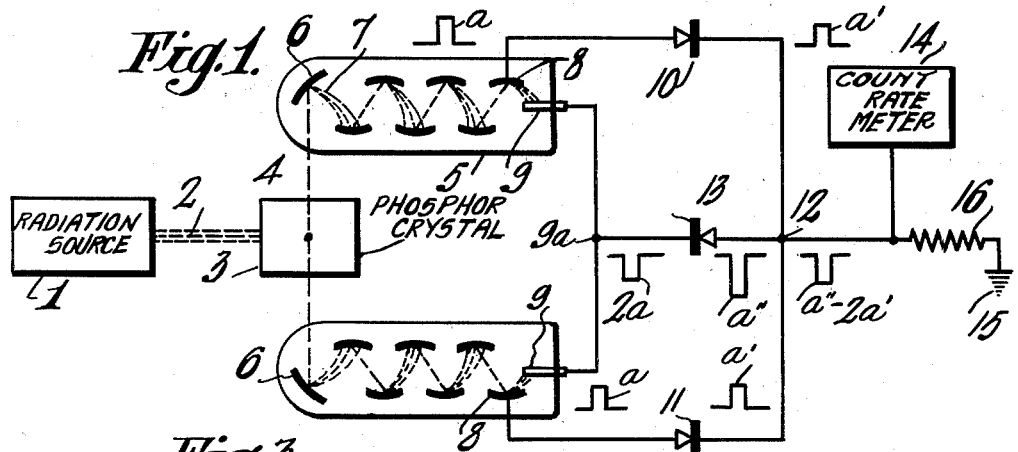
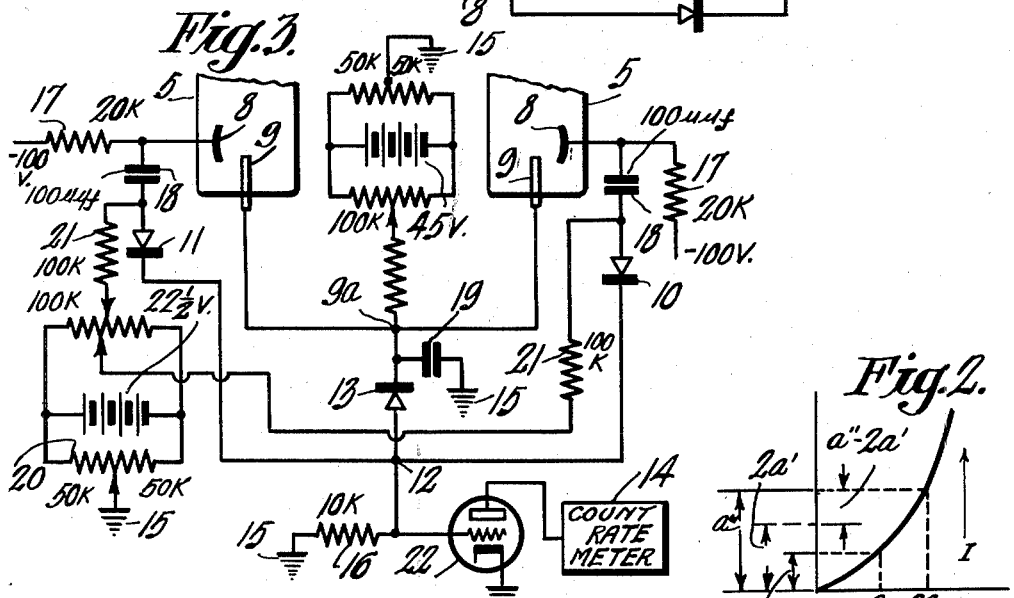
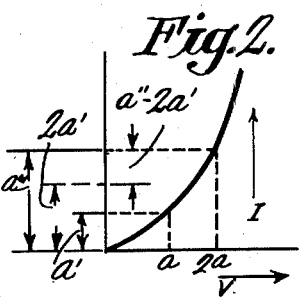
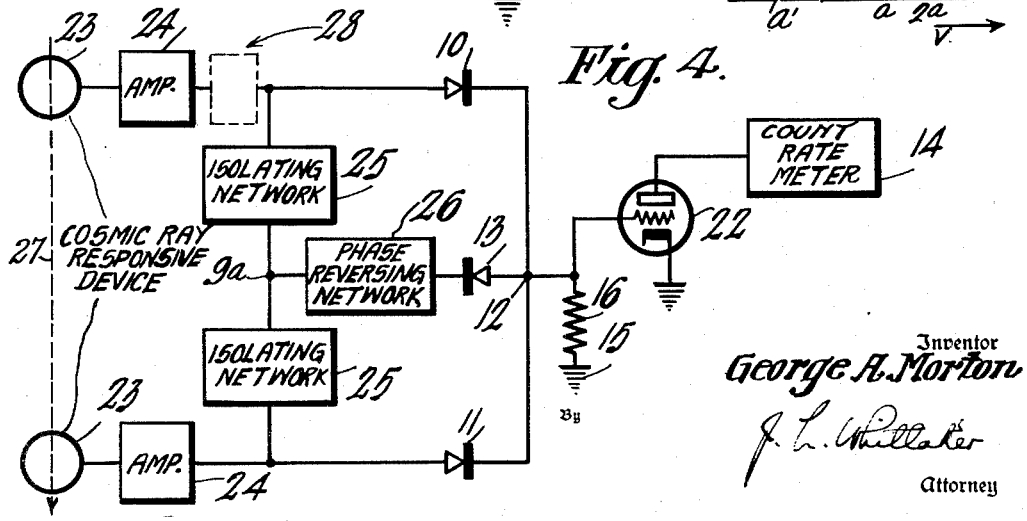
Inventor
George A. Morton
J. L. Whittaker
Attorney Patented Aug. 1, 1950

2,517,404

UNITED STATES PATENT OFFICE 2,517,404

SCINTILLATION TYPE RADIATION DETECTOR AND COINCIDENCE CIRCUIT THEREFOR

George A. Morton, Princeton, N. J., assignor to Radio Corporation of America, a corporation of Delaware Application April 1, 1949, Serial No. 84,818

14 Claims. (Cl. 250—83.3)

This invention relates generally to nuclear radiation counters and more particularly to such counters employing a scintillating screen as the initial radiation detector in the counter system.

The conventional nuclear radiation scintillating counter systems have consisted basically of a fluorescent screen or phosphor crystal exposed to the nuclear radiation, a photo-cathode capable of converting scintillations of light into streams of electrons, an electronic multiplier for amplifying the stream of electrons, a pulse height discriminator and a counter-rate meter.

The conventional counters of this type have been limited in their use to rather high energy radiations, because of the "noise" or "background" pulses originating in the multiplier photo-tubes by the thermionic or spontaneous emission of electrons from the photo-cathode. The background pulses overlap the signal pulses originating in the fluorescent screen and have required the use of pulse height discriminators to eliminate the effects of the low thermionic pulses, and have limited the use of such systems to radiations of high enough energy to be recordable over the reducing effect of discriminator. Attempts have been made to use this conventional type of counter system for low energy nuclear radiation by resorting to cooling the photo-tubes by dry ice or liquid air to reduce the number of spurious thermionic pulses.

The present invention overcomes the disadvantages of the convenional counter by providing a pair of photo-cathode multipliers exposed to the phosphor crystal fluorescent screen and circuits connected to the outputs thereof whereby the system responds to all scintillations of the fluorescent screen but not to noise or background electron emission from the photo-cathodes, except as to those emissions that take place accidentally from the respective cathodes at the same instantaneous moment, that is, simultaneously within less than a small part of a microsecond. Such accidental coincidental emissions do take place but in the multiplier photo-cathode tubes of average thermionic electron emission of about a thousand electrons per second, the expected number of accidental coincidental emissions is of the order of 10 to 30 pulses a minute for a tube having a resolving time of $10^{-7}$ seconds.

The principal object of the invention is to provide a scintillation nuclear radiation counter system adapted to respond to low energy nuclear radiations and without substantial response to background electron emissions of the photo-cathode multiplier.

Another object of the invention is to provide such a system in which the effects of the background spurious counts are reduced to a low and negligible value.

Another object of the invention is to provide such a system in which a plurality of responding photo-cathode multipliers are so connected to each other and to external circuits that the effects of thermionic emission in the photo-cathodes are eliminated, except for thermionic emissions that occur accidentally simultaneously.

Another object of the invention is to provide such a system in which are included crystal diodes rather than the conventional vacuum tubes.

Another object of the invention is to provide such a system in which the effects of the background spurious counts from the individual multiplier are balanced out and reduced to zero, except for accidental simultaneously spurious emissions in the plurality of multipliers, and the effects of the pulses originating in the scintillating phosphor crystal are added and amplified in accordance with the conductive characteristics of crystal diodes.

The various embodiments and features of the invention will be described in detail hereinafter by reference to the accompanying drawings in which:

Figure 1 is a diagrammatic sketch of the basic embodiment of the invention, showing two photo-cathode multipliers and 3 crystal diodes in the external circuits;

Figure 2 is a typical characteristic curve of a crystal diode;

Figure 3 is a diagrammatic sketch of the basic invention disclosed in Figure 1 with circuits and approximate values of the various elements for balancing and adjusting the device; and Figure 4 is a diagrammatic sketch of the invention applied to two amplifiers connected to any conventional source of electrical pulses.

Referring to Figure 1, numeral 1 represents a source of nuclear radiation, for example gamma rays 2, which fall on a transparent phosphor crystal 3, such as a thallium activated sodium iodide, causing scintillations of the crystal fluorescent centers in the lattice of the molecules, which are manifested by photons of light rays 4 radiated from the crystal.

Adjacent to crystal 3 are two photo-cathode multipliers 5 so placed that the light rays fall upon the cathodes 6 where they cause secondary electrons 7 to be emitted. These electrons are drawn down the lengths of the multipliers under the influence of conventional connected electric potentials (not shown) until they reach the last dynodes 8 in the series of dynodes and the collectors 9.

Dynodes 8 are connected in the same polarity to one side of the crystal diodes 10 and 11, respectively, and the other sides of the diodes are connected together at point 12. Collectors 9 are connected together at point 9a and to one side of crystal diode 13, the other side of crystal diode 13 being connected to point 12 in opposite polarity to the diodes 10 and 11. Point 12 is also connected to a counter-rate meter 14 and to ground 15 through resistor 16.

Figure 2 is a characteristic plot of the relation between the current through a crystal dynode, such as dynodes 10, 11 and 13, for various voltages across the crystal;

In operation: Radiation from source 1 strikes phosphor crystal 3 causing scintillations of light 4, which strike photo-cathodes 6 of multiplier tubes 5, where they cause the emission of secondary electrons 7. These electrons are multiplied in the tubes 5 as the electrons are drawn towards dynodes 8 and collectors 9. There is thus produced at dynodes 8 and at collectors 9 short duration current pulses that flow in the leads connected thereto. Electrons flow out of leads connected to collectors 9 producing negative current pulses and into dynodes 8 giving positive current pulses. The electric constants of the circuits are so adjusted that the current pulses from the collectors equal those to the dynodes and if no crystals are present in the circuits, these four current pulses would add up to zero.

With the crystals connected as disclosed, the current pulses from dynodes 8 represented by $a$ (see Figures 1 and 2) have the value of $a'$ after passing through crystals 10 and 11, respectively, so that upon reaching point 12, the pulses add up to the value of $2a'$. Pulses from collectors 9 add up at point 9a to a value of $2a$ and upon passing through crystals 13 have a value of $a''$. As the characteristic resistive curves of the crystals 10, 11 and 13 are not linear, $a''$ is greater than $2a'$ and the difference, $a''$ minus $2a'$ (Figure 2) represents the amplitude value of the coincidence or resultant current pulses that are transmitted to ground 15 through resistor 16. There is thereby established a coincidence or resultant pulse voltage with respect to ground at point 12 to be transmitted to counter-rate meter 14.

When a pulse occurs in only one multiplier, such as a pulse originating in the emission of a thermionic electron from the photo-cathode of one multiplier, equal pulses, but opposite in sign, pass through crystals 10 and 13 or 11 and 13, according to which of the two photo-cathodes originated the emitted thermionic electron. These two pulses cancel each other and no resultant pulse is transmitted to the meter 14.

It has been found in practice that even with the photo-cathodes in complete darkness many hundreds of spurious pulses occur per second. It is obvious that some of these pulses would occur at exactly the same instant even to a few tenths of a microsecond. The number of spurious coincidences that do occur simultaneously will be equal to the product of the background pulses from each of the photo-cathodes multiplied by the resolving time of the circuit. As it has been found practical to obtain resolving times as short as a few tenths of a microsecond, the expected number of accidental coincidences do not exceed 10 to 30 pulses a minute.

In practice, the basic circuit disclosed in Figure 1 requires conventional additional elements to balance the circuits and adjust for differences in capacities of the dynodes 8 and collectors 9 in the respective tubes and any differences that may exist between the crystals. A practical circuit is disclosed in Figure 3 in which the values of the various elements are shown. A biasing voltage is applied to dynodes 8 through resistors 17. Capacitors 18 of, for example 100 $\mu\mu f.$, are inserted between dynodes 8 and crystals 10 and 11, respectively, and capacitor 19, of higher capacity than capacitors 18, is inserted between point 9a and crystal 13, one side of which capacitor is grounded at 15. Crystals 10 and 11 are biased by the conventional potentiometer through resistors 21. Voltage pulses across the resistor 16, from point 12 are shown as being applied to the grid of amplifier tube 22, the output of which is transmitted to a count-rate meter.

It is of course apparent that the type of coincidence circuit disclosed herein is not limited in its use to secondary emission multiplier systems, but it may be used in any system in which a response is desired to be observed and counted only when both parts of the double or parallel electronic system are energized simultaneously from an electron source but that the system shall not be responsive to energization when only one section is energized.

As an example (see Figure 4), the invention may be used as a cosmic ray telescope by positioning a pair of devices 23, such as a pair of Geiger tubes, in fixed relation to each other and conducting the outputs thereof to a pair of multipliers or amplifiers 24 the outputs of which are connected to crystal diodes 10 and 11, respectively. The output of the crystal diodes are connected together at point 12, as hereinbefore described in connection with Figures 1 and 3. The amplifiers are also connected to common point 9a through decoupling or isolating networks 25 and point 9a is connected through phase reversing network 26 and crystal diode 13 to point 12. Point 12 is also connected to ground 15 through resistor 16 and to an amplifier tube 22, which is connected to counter-rate meter 14.

It will be seen, from the description of the operation of the device disclosed in Figure 1, that when any cosmic ray such as shown by arrow 27 passes through both of the pair of responsive devices 23, a response will be recorded by counter 14 and no response will be recorded unless both responsive devices 23 are simultaneously energized. The device of Figure 4 may thus be used as a cosmic ray telescope.

If it be desired to record phenomena involving time delays, a time delay network may be inserted in one division of the circuit, as shown by dotted square 28. With such a net in the circuit, the coincidence will be recorded by counter 14 only when the delay difference in time of the two responsive devices 23 is equal to the delay time of net 28.

There is thus disclosed a unique method of and apparatus for reducing the effect of spurious emissions from photo-cathodes in a pair of multipliers or limiting the final or resultant response of a two section parallel circuit system to stimuli impressed simultaneously thereon or the two sections are so stimulated at predetermined intervals of times apart, the predetermined intervals being compensated for in one of the sections of the parallel circuits by a time delay network. This is accomplished by multiplying or amplifying the energy from a common source into pulses, dividing the pulses into respective pairs of pulses and balancing out the effects of the pulses originating in the multipliers or amplifiers, such as those originating as spurious thermionic secondary emissions, and thus creating a coincidence pulse free of spurious emission effects that may be utilized in any appropriate circuit.

I claim as my invention:

1. In an electronic apparatus including a pair of electronic energy responsive devices, a plurality of non-linear resistive conductors, a pair of electron amplifiers and a third electronic energy responsive device, the method of energizing the said third responsive device only when said pair of devices are energized simultaneously comprising: dividing the outputs of said pair of amplifiers, passing one each of said divided outputs through respective non-linear resistive conductors, combining the others of said divided outputs in opposite polarity to said first-mentioned outputs, and passing the combined other outputs thereof through a third non-linear resistive conductor, combining the outputs of said conductors into a coincidence output and applying said coincidence output to said third responsive device.

2. In an electronic apparatus including a pair of electronic energy responsive devices, a pair of electron multipliers, a plurality of non-linearly resistive conductors, and a third electronic energy responsive device, the method of energizing the said third responsive device only when said pair of devices are energized simultaneously comprising: dividing the outputs of said pair of multipliers, passing one each of said divided outputs through non-linear resistive conductors, combining the others of said divided outputs and in opposite polarity to said first-mentioned outputs, and passing the combined other outputs thereof through a third non-linear resistive conductor, combining the outputs of said conductors into a coincidence output and applying said coincidence output to said third responsive device.

3. In a nuclear radiation counter system including a light source responsive to said radiation, a pair of secondary electron emission surfaces responsive to the light rays from said source, a pair of electron multipliers, and a counter, the method of reducing the effect of spurious emission of electrons from the said surfaces comprising: dividing the outputs of said multipliers at the last stage thereof, non-linearly varying respectively the amplitudes of one each of said pairs of outputs, combining the others of said pair of outputs and non-linearly varying the amplitudes of said combined outputs and reversing the phase thereof, combining all of said non-linearly varied outputs, whereby coincidence outputs are produced, and counting said coincidence outputs.

4. In an electronic apparatus including a photo-cathode multiplier responsive to a light source, a non-linearly resistive conductor and a counter, the method of reducing the effect of spurious electron emission from the said photo-cathode of said multiplier comprising: providing a second photo-cathode multiplier responsive to said light source, dividing the outputs of each of said multipliers into pairs of electric pulses, passing one each of said divided outputs respectively through a pair of said conductors, combining the others of said divided outputs into electric pulses and passing said last-mentioned pulses through a third said conductor and reversing the phase of said last-mentioned pulses, combining the outputs of said conductors, and applying said combined conductor outputs to the said counter.

5. In an electronic system including a pair of devices responsive to electron energization each of which devices is connected to a multiplier, a pair of non-linear resistive conductors and a counter, the method of limiting the action of the recorder to such energization as reach the responsive devices simultaneously, comprising: dividing the output of each of such multipliers into two series of pulses, passing one each of said pairs of pulses through respective said conductors, combining the others of said pairs of pulses and passing said combined pulses through a third said conductor and reversing the phase of said combined pulses, combining the outputs of said conductors into coincidence pulses; and applying said coincidence pulses to said counter.

6. In an electronic system including a pair of electron devices responsive to exterior stimulations applied to said devices unsimultaneously, a pair of multipliers, a variable time delay network, a pair of non-linear resistive conductors and an electron pulse responsive unit, the method of determining the time interval between the stimulations of said electron responsive devices comprising: dividing respectively the outputs of said multipliers into pairs of electric pulses, passing one pulse of one of said pairs of pulses directly through one of said conductors, passing the other pulse of the other of said pairs of pulses through a time delay network and a second of said conductors, combining the other pulses of both of said pairs of pulses and passing said combined pulses through a third said conductor and reversing the phase of said combined pulses, combining the outputs of said conductors, and applying said combined outputs to said electron pulse responsive unit, whereby the amount of time delay in said time delay network is a measure of the time interval between the stimulations of said electron responsive devices.

7. An electronic apparatus comprising: means responsive to a pair of electronic energy sources, means for multiplying the energy of signals derived from said responsive means, means for dividing each of said multiplied signals into pairs of electric pulses, means for respectively varying non-linearly one each of said divided pairs of electric pulses, means for combining the others of said pairs of electric pulses and varying non-linearly said combined pulses, means for combining in opposite polarity all of said varied pulses to produce coincidence pulses, and means for utilizing said coincidence pulses.

8. An electronic apparatus comprising: means responsive to an energy source for creating a pair of electric pulses, means for dividing each of said pair of electric pulses into pairs of electric pulses, means for individually and non-linearly varying respectively one each of said divided pairs of pulses, means for combining the others of said plurality of pairs of pulses, means for non-linearly varying the said combined pulses in opposite polarity, means for combining at a point all of said varied pulses, whereby coincidence pulses are produced, and means for utilizing said coincidence pulses.

9. A nuclear radiation counter comprising: means for transforming said radiation into a pair of electric pulses, means for transforming said nuclear radiation into light rays, means for transforming said light rays into a pair of electron currents, means for multiplying said currents into pairs of electric pulses, means for individually and non-linearly varying respectively one each of said divided pairs of pulses, means for combining the others of said plurality of pairs of pulses, means for non-linearly varying the said combined pulses in opposite polarity, means for combining at a point all of said varied pulses, whereby coincidence pulses are produced, and means for utilizing said coincidence pulses.

10. A nuclear radiation counter comprising: a phosphor crystal exposed to said radiation whereby a plurality of light rays are produced, a pair of photo-cathode multipliers exposed to said rays whereby a pair of electric pulses are produced, means for dividing each of said pair of electric pulses into pairs of electric pulses, means for individually and non-linearly varying respectively one each of said divided pairs of pulses, means for combining the others of said plurality of pairs of pulses, means for non-linearly varying the said combined pulses in opposite polarity, means for combining at a point all of said varied pulses, whereby coincidence pulses are produced, and means for utilizing said coincidence pulses.

11. An electronic apparatus comprising: means for responding to an energy source for creating a pair of electric pulses, means for individually and non-linearly varying one each of said divided pairs of pulses, means associated with one of said varying means for introducing a time delay to one of said pulses, means for combining the others of said plurality of pairs of pulses, means for non-linearly varying the said combined pulses in opposite phase, means for combining at a point all of said varied pulses, whereby coincidence pulses are produced, and means for utilizing said coincidence pulses.

12. A nuclear radiation counting system including: means for transforming said radiation into a pair of light rays, a pair of parallel circuits each including a secondary emission cathode responsive to said rays, an electron multiplier and means for dividing the multiplied electrons into a pair of electric pulses, means for individually and non-linearly varying respectively one each of said divided pairs of pulses, means for combining the others of said plurality of pairs of pulses, means for non-linearly varying the said combined pulses in opposite polarity, means for combining at a point all of said varied pulses, whereby coincidence pulses are produced, and means for utilizing said coincidence pulses.

13. In a nuclear radiation counter system including a light source responsive to said radiation, a pair of secondary electron emission surfaces responsive to the light rays from said source, a pair of electron multipliers, and a counter, the method of reducing the effect of spurious emission of electrons from the said surfaces comprising: dividing in opposite polarity the outputs of said multipliers at the last stage thereof, non-linearly varying respectively the amplitudes of one each of said pairs of outputs, combining the others of said pair of outputs and non-linearly varying the amplitudes of said combined outputs combining all of said non-linearly varied outputs, whereby coincidence outputs are produced, and counting said coincidence outputs.

14. An electronic apparatus comprising: means responsive to a pair of electronic energy sources, electron multiplier means each including an output stage and a collector element for multiplying the energy of signals derived from said responsive means, means including connections to the output stages and the collector elements of said signal multiplying means for dividing each of said multiplied signals into pairs of electric pulses of opposite polarity, means for respectively varying non-linearly one each of said divided pairs of electric pulses, means for combining the others of said pairs of electric pulses and varying non-linearly said combined pulses, means for combining in opposite polarity all of said varied pulses to produce coincidence pulses, and means for utilizing said coincidence pulses.

GEORGE A. MORTON.

REFERENCES CITED

The following references are of record in the file of this patent:

Morton and Robinson: Nucleonics, Feb. 1949, pp. 25–29.